No. 727,911. PATENTED MAY 12, 1903.
H. M. CRITES.
CONVEYER.
APPLICATION FILED DEC. 26, 1902.
NO MODEL. 3 SHEETS—SHEET 2.
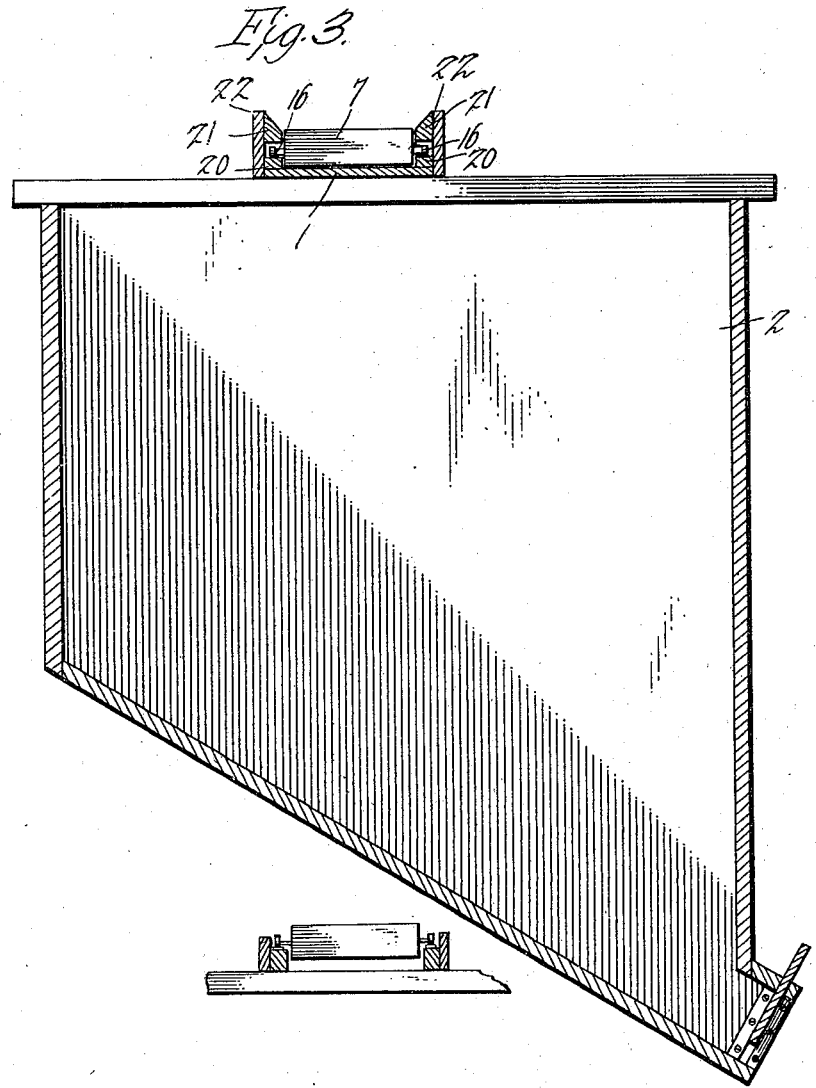

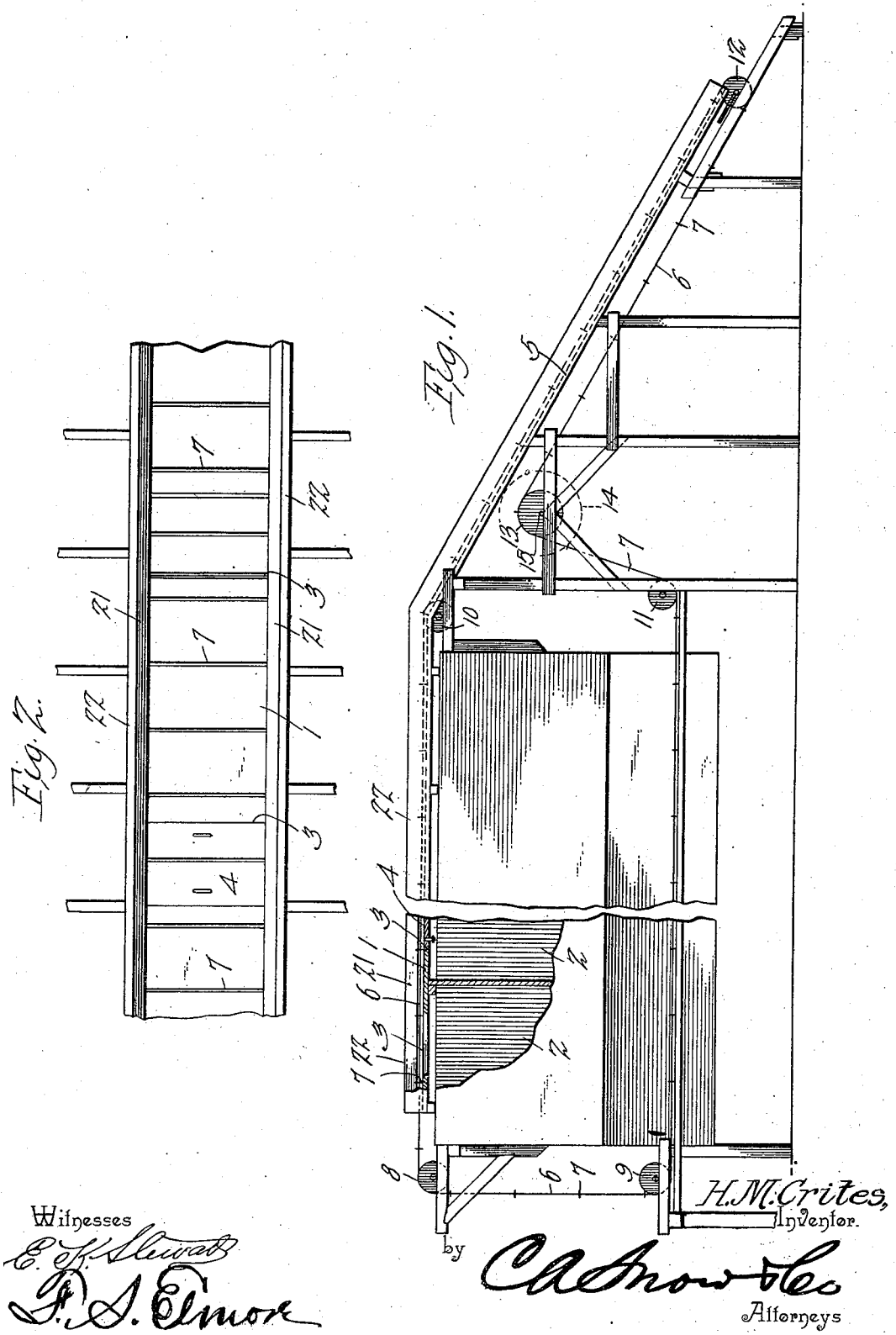

No. 727,911. PATENTED MAY 12, 1903.
H. M. CRITES.
CONVEYER.
APPLICATION FILED DEC. 26, 1902.
NO MODEL. 3 SHEETS—SHEET 3.
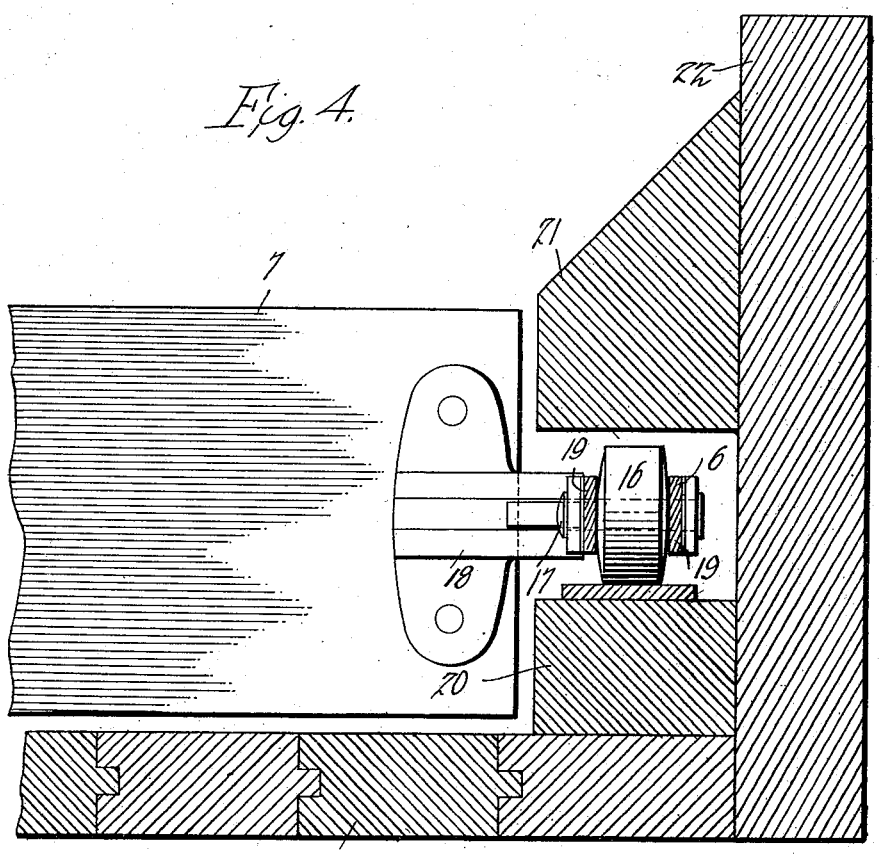

No. 727,911. Patented May 12, 1903.

UNITED STATES PATENT OFFICE.

HENRY MONROE CRITES, OF CIRCLEVILLE, OHIO.

CONVEYER.

SPECIFICATION forming part of Letters Patent No. 727,911, dated May 12, 1903.

Application filed December 26, 1902. Serial No. 136,667. (No model.)

*To all whom it may concern:*

Be it known that I, HENRY MONROE CRITES, a citizen of the United States, residing at Circleville, in the county of Pickaway and State of Ohio, have invented a new and useful Conveyer, of which the following is a specification.

My invention relates to conveyers, and has for its objects to produce a device of this character which will be simple of construction, efficient in operation, and which is especially adapted for conveying the materials in canning-factories and the like and distributing them to their respective receiving-bins.

The invention comprises the details of construction and combination of parts more fully hereinafter described.

In the accompanying drawings, Figure 1 is a longitudinal sectional elevation of the device. Fig. 2 is a fragmentary plan view of the same. Fig. 3 is a transverse vertical section through one of the bins, showing the conveyer arranged above the same. Fig. 4 is an enlarged view showing the details of one of the conveyer-flights and its guiding-roller and track.

Referring to the drawings, 1 indicates a floor or platform sustained in any suitable manner and having bins or compartments 2, situated beneath the same. There may be any suitable number of these compartments for accommodating the various materials received in canning-factories or the like, and the floor is provided with a series of openings 3, located one above each of the underlying bins. These openings may be closed in any suitable manner; but I prefer to employ removable trap-doors 4 for this purpose. These trap-doors when seated in place lie flush with the upper surface of the floor and constitute an unbroken continuation of the same.

5 indicates an inclined platform or way extending from the ground surface to the platform 1, up which the material to be delivered onto the platform is conveyed, the platform being, in fact, a continuation of the inclined way.

6 indicates an endless conveyer provided with flights 7. This conveyer is mounted on suitable guide-pulleys 8, 9, 10, 11, 12, and 13 and travels up the inclined way along the platform 1, thence downward and back beneath the platform and inclined way, and is driven by means of a drive-wheel 14, mounted on shaft 15, on which is also mounted the guide-pulley 13, the drive-wheel being in belt connection with any suitable source of power. The conveyer-flights 7 are in the form of vertically-disposed blades provided at their ends with guide-wheels 16, mounted on parallel shafts 17, projecting from suitable heads 18, riveted to the ends of the conveyer-flights. The flights are flexibly connected in the usual manner by means of links 19. The inclined way 5 and platform 1 are provided with tracks 20, upon which the rollers 16 at the ends of the flights travel. Above the tracks are overhanging guides 21, projecting laterally from the sides of vertical walls 22, arising from the surface of the inclined ways and platform. These walls, which consist of boards stood upon their edges and secured in any suitable manner, extend throughout the entire length of the way 5 and platform 1 at each end of the conveyer-flights and constitute a channel in which the material being handled is moved by the conveyer-flights.

The bins which receive the material being distributed are provided with inclined bottoms leading to a discharge-opening closed in any suitable manner and adapted for the automatic discharge of the contents of the bin.

The operation of the device is as follows: The material to be handled by the apparatus is discharged upon the inclined way 5 between the channel-walls 22 and is conveyed up the same and along the surface of the platform 1, which overlies the bins 2, by means of the flights 7. The bins are sufficient in number and capacity to accommodate the various materials usually received in canning-factories—such, for example, as green corn, peaches, tomatoes, and the like—and in order to distribute these various materials to their respective bins it is simply necessary to close all of the openings in the platform except the one over the particular bin which is to receive the material being handled, and the conveyer-flights will move the material over the surface of the platform and discharge it through the opening into said bin.

From the foregoing description it will be seen that I produce an elevating, conveying, and distributing apparatus which is extremely simple in construction and operation and which is admirably adapted for use in canning-houses or the like where it is desired to distribute a variety of materials into respective compartments. In attaining these ends I do not limit or confine myself to the structural details herein shown and described, inasmuch as various changes may be made therein without departing from the spirit or scope of my invention.

Having thus described my invention, what I claim is—

In a device of the class described, the combination with a plurality of compartments, of a floor or platform situated over said compartments and provided with openings communicating therewith, a conveyer-chain provided with flights for conveying material over the platform and discharging it through the openings into the compartments beneath, axles carried at the ends of the flights and provided with rollers, guide-walls mounted on the platform at the ends of the conveyer-flights, tracks for the flight-rollers mounted on the platform within the guide-walls, and guides carried by the walls and overlying the tracks.

In testimony that I claim the foregoing as my own I have hereto affixed my signature in the presence of two witnesses.

HENRY MONROE CRITES.

Witnesses:
IRVIN F. SNYDER,
CLARENCE CURTAIN.